મ3,112,313
Patented Nov. 26, 1963

3,112,313
NOVEL 7-THEOPHYLLINE DERIVATIVES AND
PROCESS FOR THE PRODUCTION THEREOF
Erwin Kohlstaedt, Frankfurt am Main, and Karl Heinz
Klingler, Langen, Hesse, Germany, assignors to Chemiewerk Homburg Zweigniederlassung der Deutschen
Gold- und Silber-Scheideanstalt vorm. Roessler, Frankfurt am Main, Germany, a corporation
No Drawing. Filed May 3, 1960, Ser. No. 26,440
Claims priority, application Germany May 5, 1959
5 Claims. (Cl. 260—256)

This invention relates to novel 7-theophylline derivatives which are substituted in 7-position by a radical of the general formula

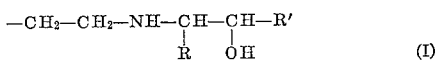

wherein R is hydrogen or a methyl radical and R' is a hydroxyaryl radical such, for example, as the mono- or dihydroxy phenyl radical, and a process for the production thereof.

The process comprises subjecting ketones of the general formula

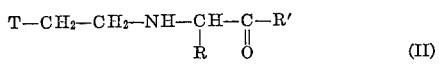

wherein T is the 7-substituted theophylline radical, R and R' are as defined above and R' may also be a benzyl hydroxyaryl radical, to catalytic hydrogenation to form 7-theophylline derivatives substituted in the 7-position with a group corresponding to the general Formula I. Suitable catalysts are the conventional finely divided metal catalysts such, for example, as noble metal catalysts such as platinum or palladium.

The process may be effected at normal temperatures or elevated temperatures, a preferred temperature range being from about 30° to about 60° C. When operating with compounds (II) wherein R' is a benzyl hydroxyaryl radical, and effecting the catalytic hydrogenation under conditions such that the ketone is reduced to the alcohol, the benzyl hydroxy groups likewise undergo hydrogenating cleavage at the aromatic nucleus. As an alternative when using compounds (II) as the starting materials wherein R' is a benzyl hydroxyaryl radical, the hydrogenation may be effected in two stages by first hydrogenating off the benzyl group with palladium catalysts without the hydrogenation of the keto group taking place, and subsequently chemically or catalytically reducing the keto group, particularly suitable for the catalytic reduction being platinum catalysts. The intermediates need not be isolated. After the hydrogenation with the palladium catalyst has already slowed down, the catalyst is separated by filtration and the keto group is now reduced by adding, for example, the second catalyst and bringing the hydrogenation to completion.

A particularly suitable method of producing the ketones of the general Formula II charged into the process of the invention is as follows:

An aminoalkyl xanthine of the general Formula III is reacted with a halogen ketone of the Formula IV:

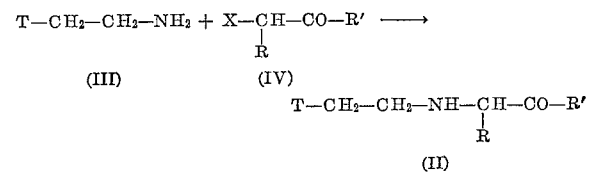

T, R and R' in these general formulae are as defined above while X is halogen, e.g., chlorine or bromine.

When starting with compounds of the general Formula IV wherein R' is a benzyl hydroxyaryl radical, e.g., a benzyl hydroxyphenyl radical, compounds of the general Formula II may be obtained by subjecting the benzyl hydroxy radical to hydrogenating cleavage in the presence of a metal catalyst of, for example, palladium. It is possible in this manner to hydrogenate the benzyl radical off without attacking the keto group. The keto group is then reduced in a separate operational step as already described, e.g., hydrogenated in the presence of a platinum catalyst.

The reactions between the aminoalkyl xanthines of the general Formula III and halogen ketones of the general Formula IV may be effected in a solvent. Preferred solvents for this purpose are lower anhydrous or aqueous alcohols. The process may be carried out at normal temperatures or elevated temperatures, especially at temperatures of below 100° C. It is desirable to use an excess of the amine in this condensation.

The novel theophylline derivatives are characterized by particularly advantageous therapeutical properties. They show a substantially higher coronary effect than theophylline itself. The dioxy compound which may, for example, be prepared in accordance with Example 2, shows a coronary extension which is from 10 to 50 times that of theophylline itself when tested on isolated guinea pig hearts in doses of 0.002 to 0.1 mg. according to Langendorff. The effect on blood pressure likewise is more pronounced as compared with that of theophylline or its phenyl derivatives containing no phenolic hydroxyl group. In tests on cats using doses of between 0.02 and 2.0 mg./kg., increases in blood pressure were measured in each case. These findings could be confirmed in tests on healthy humans. When administering 10 mg. of the finished product of Example 2 by intravenous injection, the blood pressure immediately increases and the increase continued for 15 minutes. It may be pointed out by way of comparison that noradrenaline, although being still efficient in smaller doses, has only one tenth of this duration of effect.

The broncholytic effects of the novel compounds likewise are better than those of other theophylline derivatives. Thus, for example, the effect of the final compound of Example 2 on isolated guinea pig bronchia is ten times that of β-oxypropyl theophylline which up to the present was considered to be the most efficient theophylline derivative in this respect and is used in therapy as an asthma agent. Moreover, the toxicity of the novel compounds is lower than that of, for example, theophylline. The $LD_{50}$ on mice for the final compound of Example 2 is 1.6 times and for the compound of Example 3, 1.7 times the corresponding value of theophylline.

*Example 1*

94 gms. of 7-(β-aminoethyl)-theophylline are dissolved in a 60% ethyl alcohol and a solution of 28 gms. of p-chloroacetyl phenol in 170 ml. of ethyl alcohol are added dropwise within 2 hours into the refluxed solution while stirring. Boiling is continued for another hour and then most of the alcohol is distilled off in vacuo. After dilution with water the precipitated 7-[β-(β'-p-hydroxyphenyl - β' - oxoethylamino) - ethyl] - theophylline is separated by suction filtration. For conversion into the hydrochloride, the base washed with water and dried in a desiccator is acidified with alcoholic hydrochloric acid. Upon standing, the crystalline hydrochloride is subjected to suction filtration and dried. There are obtained 34 gms. of product having a melting point of 268–269° C. which may be recrystallized from methyl alcohol for further purification. From the aqueous mother liquors, 34 to 40 gms. of the excess 7-(β-aminoethyl)-theophylline can be recovered.

5.5 gms. of 7-[β-(β'-p-hydroxyphenyl-β'-oxoethylamino)-ethyl]-theophylline hydrochloride are dissolved in 375 ml. of distilled water and shaken with hydrogen at 45° after addition of 0.8 gm. of platinum oxide. Upon termination of hydrogen absorption, the product is filtered and concentrated in vacuo. The residue is dissolved in methyl alcohol and filtered following which 7-[β-(β'-p-hydroxyphenyl - β' - hydroxyethylamino) - ethyl] - theophylline hydrochloride is precipitated with ethyl acetate. The product which has become crystalline upon standing for some time is subjected to suction filtration and dried in a desiccator. 4.2 gms. of product having a melting point of 182–184° C. are obtained.

*Example 2*

A solution of 27 gms. of ω-chloroaceto-pyrocatechol in 150 ml. of ethyl alcohol is added dropwise within 2 hours into a stirred and refluxed solution of 81 gms. of 7-(β-aminoethyl)-theophylline in 200 ml. of a 60% aqueous ethyl alcohol. Following this, boiling is continued for another 3.5 hours while passing through nitrogen, and the precipitated product is separated by suction filtration, washed with water and dried. The product is suspended in alcohol, admixed with alcoholic hydrochloric acid while heating until an acid reaction is observed and subjected to suction filtration after cooling. Obtained in this manner are 37 gms. of 7-[β-(β'-3,4-dihydroxyphenyl - β' - oxoethylamino) - ethyl] - theophylline hydrochloride having a melting point of 246–249° C. To obtain an analytically pure product, the hydrochloride is dissolved in water and precipitated with ample acetone.

7.1 gms. of 7-[β-(β'-3,4-dihydroxyphenyl-β'-oxoethyl]-theophylline hydrochloride are dissolved in 500 ml. of distilled water and hydrogenated at 48° C. in the presence of 1 gm. of platinum oxide. When no further hydrogen is absorbed after about 5 hours, the mixture is evaporated to dryness in vacuo. Purification is effected by taking up in methyl alcohol and mixing with ethyl acetate. 7 - [β - (β' - 3,4 - dihydroxyphenyl - β' - hydroxyethylamino) - ethyl] - theophylline hydrochloride which has crystallized after several days is separated by suction filtration and dried in a desiccator. A product having a melting point of 176–178° C. is obtained in amount of 6.1 gms.

*Example 3*

(a) 7 - β - (β' - p - benzyl - oxyphenyl - β' - oxopropylamino)-ethyl theophylline: A solution of 23 gms. of p-benzyl-oxy-alpha-bromopropiophenone is added dropwise within 45 minutes at 70° C. into a solution of 39.2 gms. of 7-(β-aminoethyl)-theophylline in 115 ml. of a 60% ethyl alcohol. The mixture is boiled for additional 45 minutes, diluted with ample water and shaken with chloroform. The chloroform solution is washed with water and dried with potassium carbonate. Upon separation of the chloroform by distillation, the residue is dissolved in an ethyl alcohol-acetone mixture, and the hydrochloride of 7-β-(β'-p-benzyl-oxyphenyl-β'-oxopropylamino)-ethyl-theophylline is precipitated by adding alcoholic hydrochloric acid. In this manner, 31 grams of this product having a melting point of 241–243° C. are obtained. Further purification may be effected by recrystallization in methyl alcohol.

(b) 5 grams of this benzyl oxy compound are dissolved in 600 ml. of a 50% aqueous alcohol and hydrogenated at room temperature in the presence of 1 gm. of palladium on barium sulfate. When, after 6 hours, the absorption of hydrogen is practically terminated, the mixture is filtered, mixed with 0.3 gm. of platinum oxide and hydrogenated at 50–60° C. until 2 mols of hydrogen are taken up. Upon filtration and evaporation in vacuo, recrystallization is effected from methyl alcohol. There are obtained 3 grams of 7-(β'-p-hydroxyphenyl - β' - hydroxypropylamino) - ethyl - theophylline hydrochloride having a melting point of 208–209° C.

(c) 8 grams of the product obtained in Example 3 (a) are dissolved in a mixture of 300 ml. isopropyl alcohol and 300 ml. of distilled water and hydrogenated at room temperature after having added to the solution 1 gram of palladium on barium sulfate. Upon absorption of about 1.1 mols of hydrogen, the hydrogenation is discontinued. This is followed by filtration, concentration in vacuo and recrystallization of the dry residue from methyl alcohol. This results in 4.6 grams of 7 - β - (β' - p - hydroxyphenyl - β' - oxopropylamino)-ethyl-theophylline hydrochloride having a melting point of 194–197° C. Further hydrogenation of this hydrochloride results in the derivative obtained according to (b).

*Example 4*

By a procedure analogous to that of Example 3(a) is obtained the hydrochloride of 7-β-(β'-m-benzyl-oxyphenyl-β'-oxopropylamino)-ethyl-theophylline (melting point, 204–207° C.) and from this, by a procedure analogous to that of Example 3(b), the hydrochloride of 7-β-(β'-m-hydroxyphenyl-β' - hydroxypropylamino) - ethyl-theophylline (melting point, 174–176° C.).

What we claim is:
1. A member of the group consisting of:
(A) compounds of the formula

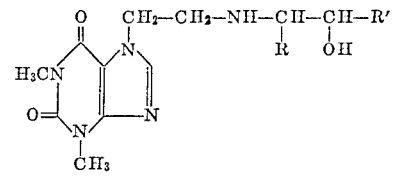

wherein R is a member selected from the group consisting of hydrogen and methyl and R' is a member selected from the group consisting of monohydroxy substituted phenyl and dihydroxy substituted phenyl, and (B) pharmacologically acceptable acid addition salts thereof.

2. 7 - [β-(β'-p-hydroxyphenyl-β'-hydroxyethylamino)-ethyl]-theophylline.

3. 7 - [β - (β' - 3,4 - dihydroxyphenyl-β'-hydroxyethylamino)-ethyl]-theophylline.

4. 7 - [β - (β' - p - hydroxyphenyl - β'-hydroxypropylamino)ethyl]-theophylline.

5. 7 - [β - (β' - m - hydroxyphenyl - β'-hydroxypropylamino)ethyl]-theophylline.

References Cited in the file of this patent

FOREIGN PATENTS 566,496     Canada _____ Nov. 25, 1958

OTHER REFERENCES

Bergman: The Chemistry of Acetylene and Related Compounds, page 80, Interscience Publishers Inc., New York, 1948.

Whitmore: Organic Chemistry, pages 616–617 (1951), Second Edition.

Spiegelberg et al.: Helvetica Chimica Acta, volume 39, pages 283–289 (1956).